United States Patent [19]

Sillars

[11] 4,197,976
[45] Apr. 15, 1980

[54] INSIDE SIDE-SEAM SOLDERING MACHINE

[75] Inventor: Frederick S. Sillars, Beverly, Mass.

[73] Assignee: USM Corporation, Farmington, Conn.

[21] Appl. No.: 907,666

[22] Filed: May 19, 1978

[51] Int. Cl.² .............................................. B23K 1/14
[52] U.S. Cl. ..................................................... 228/43
[58] Field of Search ............................ 228/33, 37, 43

[56] References Cited

U.S. PATENT DOCUMENTS

| | | | |
|---|---|---|---|
| 1,969,803 | 8/1934 | Kruse | 228/43 X |
| 2,962,995 | 12/1960 | Smith | 228/43 X |
| 3,000,338 | 9/1961 | Sillars | 228/43 X |
| 3,053,212 | 9/1962 | Flynn | 228/43 X |
| 3,056,368 | 10/1962 | Sillars | 228/44.1 R X |
| 3,190,526 | 6/1965 | Sillars et al. | 228/35 |
| 3,255,856 | 6/1966 | Sillars | 228/47 X |

Primary Examiner—Francis S. Husar
Assistant Examiner—K. J. Ramsey
Attorney, Agent, or Firm—Owen J. Meegan; Richard B. Megley; Vincent A. White

[57] ABSTRACT

Apparatus for applying solder to the inside openings of successively fed can body side seams comprises a heated stub horn extension housing a reservoir for molten solder, a solder applicator for directing solder downwardly from the reservoir to the seams, a valve for controlling solder flow from the applicator, and an automatic mechanism operable when no cans are present thus to be soldered for rapidly resupplying the reservoir with solder from a main supply pot. Can body feeding is automatically restarted when a desired solder level in the reservoir is attained.

7 Claims, 6 Drawing Figures

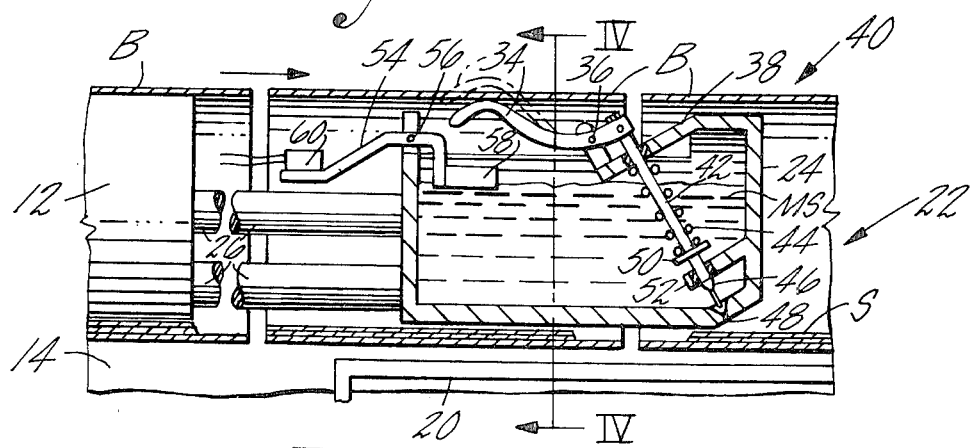

INSIDE SIDE-SEAM SOLDERING MACHINE

CROSS-REFERENCE TO RELATED APPLICATION

An application Ser. No. 874,804 for U.S. Patent, filed in the name of Frederick S. Sillars on Feb. 3, 1978, relates to means for protecting pre-striping in can bodies.

BACKGROUND OF THE INVENTION

This invention pertains to apparatus for use in applying solder to internal openings of can body side seams.

In the prior art side seam soldering apparatus a fairly well established practice has been to conduct successive can bodies, to be side seam soldered internally, along an extension of a stub horn, and over a rotary solder roll but out of contact therewith. In such arrangements the stub horn extension is customarily provided with a series of vertically displaceable "solder irons" engageable at their lower ends with the solder roll to receive heat and solder therefrom. A leading edge of each can accordingly engages a bevelled portion of each of the solder irons to raise them sufficiently to allow each inside of a side seam to pass beneath the irons whereby they can transfer heat and solder "picked up" from the roll to a wide internal band along the seam.

The need for applying internal side seam soldering, whether by the means briefly described or some other technique, exists to prevent can contents from contactng raw steel edges which might adversely affect taste or texture. Moreover, in addition to the possibility of weakening a thin-walled container by reason of a chemical reaction with uncoated inner metal edges, inside seam soldering is often highly desirable in order to avoid disturbing exterior lithography on the can bodies. A difficulty associated with known inside seam soldering approaches has been that excessive solder has been applied in bands considerably wider than required for coating the seams. No practical way exists of removing the excess solder so that any lead contamination tendency may be increased and container cost is also increased.

U.S. patents pertaining to side seam soldering of cans which may be referred to for background, if desired, include for instance, Nos. 3,000,338; 3,056,368; 3,190,526; and 3,255,856.

SUMMARY OF THE INVENTION

In view of the foregoing it is an object of this invention to provide an improved apparatus for efficiently side seam soldering containers internally.

A further object of the invention is to reduce both solder costs and the chance of lead contamination in the making of side seam soldered can bodies.

Another object of the invention is to provide continuously operable mechanism, in more effective association with mass production can making machinery, for applying a jet of molten solder in controlled flow to seal the inside seam openings of successive can bodies, the novel arrangement facilitating usage of more economical 2% tin-98% lead solder rather than one including low melting point, high tin content.

To these ends the invention contemplates providing, in a side seam soldering machine of the type comprising a heated stub horn and power means for feeding a seam-aligned series of can bodies over the horn and beyond, a reservoir for molten solder supported by the stub horn, a can body-controlled solder jet applicator for directing molten solder from the reservoir to the successive seams, and an automatic mechanism for replenishing the solder in the reservoir when no can bodies are being presented from the stub horn to the applicator. As herein shown the usual induction heat, provided for pre-heating can bodies to soldering temperature as they come from the stub horn and for heating the stub horn itself, is employed to maintain the temperature of molten solder in the reservoir supported by an extension of the stub horn, the reservoir preferably being disposed within the path of the can bodies. As the bodies are thus traversing and being internally heated circumferentially by the molten solder in the immediately adjacent reservoir, they successively actuate a valve effecting a jet from the reservoir via a downwardly directed nozzle to a progressively advancing internal side seam of each body. Preferably and as herein illustrated, when solder in the reservoir is at least partly depleted to a predetermined level, a control circuit including a mercury type switch is automatically energized to cause cessation of can body flow from a can body maker into the side seamer, and to actuate the valve for stopping solder application when the last of the bodies being fed clears the applicator nozzle. The arrangement desirably is such that, upon occurence of the last-mentioned event, a control is automatically actuated whereby replenishing molten solder from a main melting pot is caused to quickly flow into the mentioned reservoir, restore its solder level, then stop the flow from the pot to the reservoir, and restart the can body feed for further inside seam soldering. The solder jet allows only a coating appropriate to the width of the side seam.

BRIEF DESCRIPTION OF THE DRAWINGS

The foregoing and other features of the invention will now be more particularly described in connection with an illustrative embodiment and with reference to the accompanying drawings thereof, in which:

FIG. 3 is a view in side elevation and largely in section showing the solder reservoir of FIG. 2 inside the can body path and associated controls of solder flow;

FIG. 4 is a section taken on the line IV—IV in FIG. 3;

FIG. 5 is a perspective view, with portions broken away, of the control mechanism shown in FIGS. 3 and 4; and FIG. 6 is a schematic diagram of an electric control circuit employed.

DESCRIPTION OF PREFERRED EMBODIMENT

Figure 1:
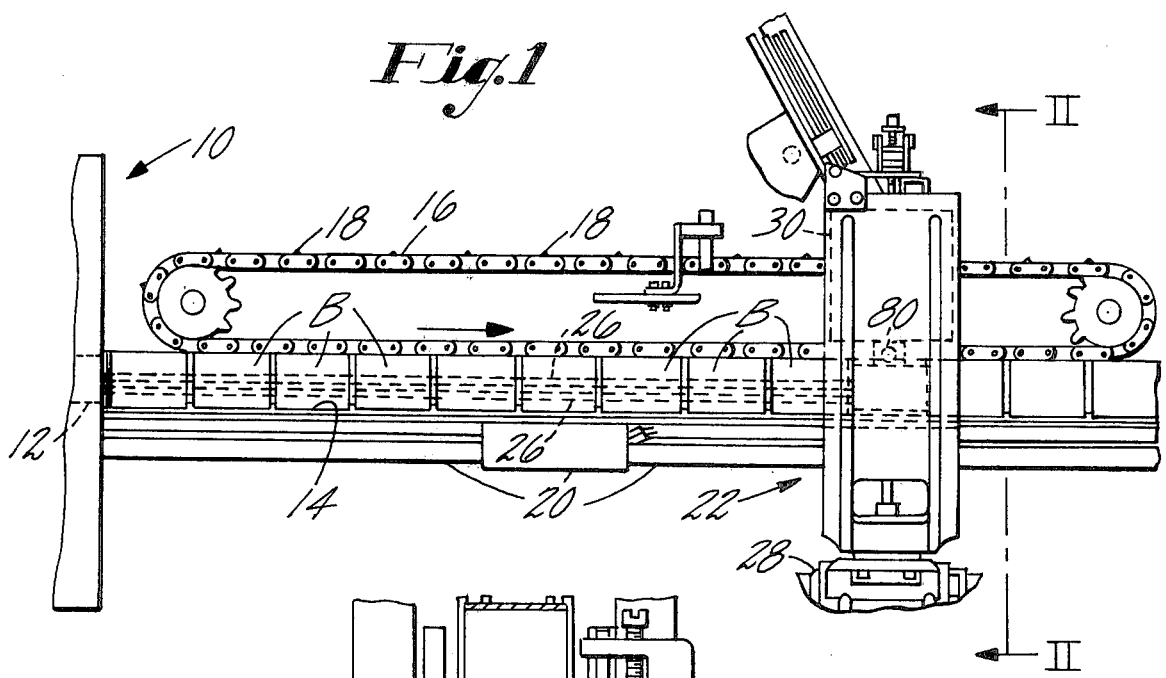
FIG. 1 is a view in side elevation, with parts broken away, of an inside seam soldering apparatus operable on can bodies being conveyed from a bodymaker along a stationary mandrel or horn.
Figure 2:
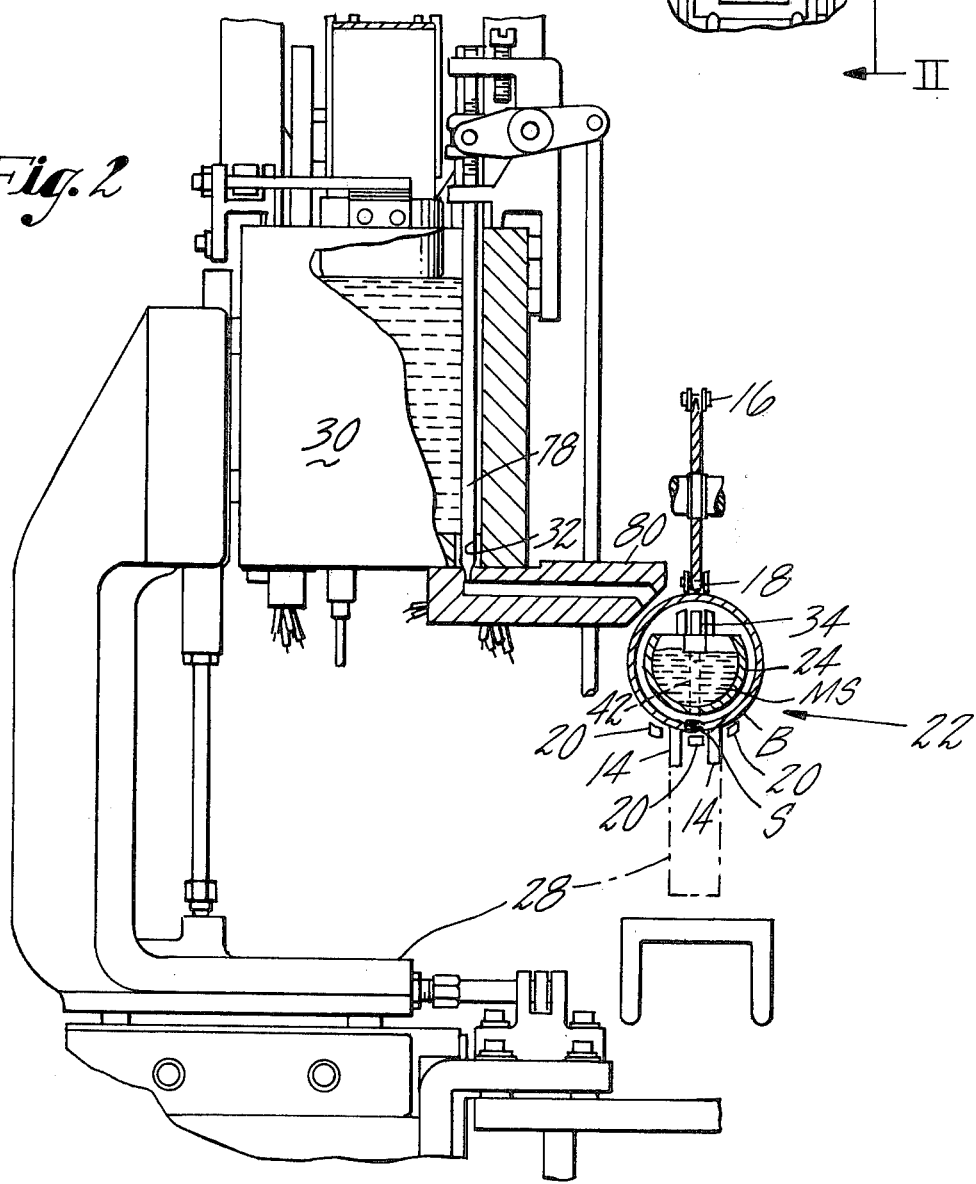
FIG. 2 is a vertical transverse section taken on FIG. 1 at II—II on an enlarged scale, and with portions broken away, showing a main solder pot and a solder reservoir within the path of can body travel.

Referring first to FIG. 1, a series of open-ended can bodies B, having been formed with side seams S, respectively, in a bodymaker generally designated 10 of conventional type, is fed in succession from a forming horn and along a cylindrical stub horn 12, FIGS. 1-5, inclusive. For this purpose the bodies B are moved in uniformly spaced, substantially coaxial alignment, for instance as urged by a reciprocating extractor bar (not shown). The bodies are slidably supported on horizontal, spaced parallel guide rails 14,14 (usually ceramic) and have their respective interlocking side seams S in alignment and disposed at the undersides of the bodies. As illustrated in FIGS. 1 and 2, for thus moving the bodies in closely spaced, end-to-end relation, an endless conveyor chain 16 is fitted with driving lugs 18 respectively engageable with the trailing rim of each can body B. The bodies are thus caused, during operation of the apparatus as will be described, to move over a suitable heating means for instance an electrical induction type heater 20 (FIGS. 1 and 2), extending just beneath and beyond the stub horn 12. In the course of travel along their path the bodies B are accordingly heated to appropriate soldering temperature as they reach inside side seam soldering mechanism 22 to be next described with particular reference to FIGS. 2–5.

The mechanism 22 comprises a preferably cylindrical reservoir 24 for molten solder MS and is supported within the path of the can bodies, when they pass from the stub horn, as by a pair of rods 26,26 extending horizontally from an end of the stub horn. A frame 28 (FIGS. 1,2) of the apparatus, in addition to carrying the guide rails 14, the heater 20, and the controls to be later explained, supports a main solder melting pot 30 (FIGS. 1,2) having a discharge nozzle 32 (FIGS. 1, 2, 4 & 5) directed for replenishing the reservoir 24 as subsequently described. The pot 30 and its associated solder feeding means may, for example, take the form of that disclosed in the abovementioned U.S. Pat. No. 3,000,338. It will be apparent that the arrangement is such that the reservoir 24 and its molten contents are heated initially by discharge from the pot 30, and by the heater 20, during soldering, and while can bodies B may not be presented for long periods and soldering has been discontinued.

The leading upper portion of each can body B arriving over the reservoir 24 engages and depresses one end of a lever 34 (FIGS. 3,5) pivotally mounted at 36 on an overhanging tongue 38 of the reservoir thus to operate a solder applicator control valve generally designated 40. A plunger 42 of the valve is accordingly raised against the resistance of a return spring 44, and an orifice cleaning tip 46 of the plunger is withdrawn from an aperture 48 formed in the underside or adjacent to the bottom of the reservoir. This enables a solder jet of controlled amount to be directed only to the successive internal openings of the advancing side seams S. Such solder flow continues as long as can bodies are presented to be side seam soldered. A collar 50 (FIGS. 3,5) affixed on the plunger 42 for confining the spring 44 may, when the plunger is allowed to descend because can bodies are not then being presented, abut a lug 52 formed on the reservoir thereby restoring the lever 34 to its non-depressed position wherein no jet of solder MS is allowed by the plunger to be emitted from the reservoir.

When the solder MS is depleted to a predetermined level in the reservoir 24, a lever 54 (FIGS. 3,5) pivoted to the reservoir at 56 and carrying a solder float 58 on one end and a mercury type switch 60 on the other end is tilted (clockwise as seen in FIG. 3). This causes a shifting of the mercury of the switch 60 whereby its electrical contacts 62 (FIG. 6) close. Consequently a control relay 64 is energized causing opening of normally closed contacts 66 in the circuit shown in FIG. 6. As one result of the contacts 66 opening, a body blank feed means (not herein shown in detail), controlled for instance by a body blank vacuum feed solenoid 68 and a valve (not shown, but actuated thereby) are deenergized to stop further advance of the can bodies into the side seam soldering machine from the bodymaker 10. A second result is closure of normally open contacts 70. The latter then effect energizing of a time delay relay 72 which is set to time out after the last of the can bodies B in the side seam soldering apparatus passes the solder applicator aperture 48.

When the relay 72 times out, its contacts 74 (FIG. 6) close. This energizes a solder pot valve solenoid 76 and hence opens a valve 78 (FIG. 2) whereby the nozzle 32 allows molten solder MS to flow rapidly into the reservoir 24 from the main pot 30 via a pipe 80, as indicated in FIG. 5. Next, when the solder supply in the reservoir 24 has reached a predetermined level, the float 58 will automatically be raised to reopen the switch 62 and deenergize the relay 64. Consequently the contacts 66 are reclosed to effect resumption of can body feed, and the contacts 70 will again open to deenergize the time delay relay 72. Now, at reopening of the contacts 74 and deenergizing of the solder pot control solenoid 76, solder flow into the reservoir 24 is cut off.

It will be apparent from the foregoing that the apparatus described provides an effective reliable, and continuously automatic mechanism for soldering inside side seam openings of the successive can bodies B. The molten solder MS is efficiently maintained at soldering temperature fully utilizing heat derived from an induction or other source 20 generally provided in existing equipment for heating the stub horn and bodies. By providing the reservoir 24 within the body path, the more economical 2% tin and 98% lead solder is generally satisfactory, whereas the former practice (requiring relatively inefficient heat transfer from a solder roll, through the solder, to the solder irons and then again through wiped on solder to the bodies) required more costly, lower melting point solder. Also, in lieu of the wasteful application of an inner broadband of solder on the seam openings and at varying circumferential distances therefrom, the present apparatus emits a controlled gravity feed jet of molten solder from the aperture 48 just sufficient for progressively sealing the edges and openings of the advancing side seams internally.

Other than replacing solder bars to be melted in the main pot 30, an attendant need have little specific concern for the application of molten solder to the inside of each seam S in economical and continuous manner. Replenishment of solder in the reservoir 24 is done quickly and automatically when the depleted solder level dictates so that interruption of the can making operation is at a minimum. It will be apparent, too, that the invention provides an arrangement whereby only external portions of the can bodies adjacent to their side seams engage the rails 14 during soldering thereby affording very little or no intereference with any lithography on the bodies.

I claim:

1. Apparatus for soldering internally the aligned side seams of successive can bodies being advanced by feed mechanism along and from a stub horn, comprising a reservoir for molten solder supported by the stub horn and disposed within the path of the bodies, and an applicator means mounted on the reservoir and arranged for directing molten solder therefrom to the internal openings of the successive side seams, said applicator means comprising a can-body actuatable valve, operable to close when there is an interruption in the flow of cans along the stub horn for controlling jet flow of molten solder from an aperture in the reservoir.

2. Apparatus as in claim 1 wherein the valve comprises a plunger having one end constituting an orifice cleaning tip receivable in said aperture.

3. Apparatus as in claim 2 wherein a second end of said plunger is operatively connected to an operating member disposed to be actuated by engagement therewith of each advancing can body yieldingly to retract said tip from said aperture.

4. Apparatus as in claim 1 wherein a heater is disposed to preheat the bodies and the stub horn, the reservoir is largely cylindrical, substantially coaxial with the can bodies coming from the stub horn, and adjacent a portion of the heater, and the aperture is arranged in an underside of the reservoir adjacent to said heater portion.

5. Apparatus as in claim 1, further comprising automatic control means operable to replenish molten solder in the reservoir when the solder therein has descended therein to a predetermined level in response to operation of the applicator means.

6. Apparatus as set forth in claim 1 wherein control means associated with said reservoir and responsive to the level of solder therein is actuatable to regulate operation of said valve and the feed mechanism for advancing said can bodies relative to the reservoir.

7. Apparatus as set forth in claim 6 wherein said control means includes a lever pivotally mounted on the reservoir, one end of the lever carrying a solder float and the other end of the lever carrying a mercury type switch electrically connected to the can body feed mechanism to deenergize the latter upon depletion of the solder in the reservoir.

* * * * *